Mar. 3, 1925.

1,528,050

F. F. FORSHEE

RESTAURANT WAFFLE IRON

Filed Aug. 22, 1922

WITNESSES:
P. H. Crock
H. M. Biebel

INVENTOR
Frank F. Forshee.
BY
Wesley G. Carr
ATTORNEY

Patented Mar. 3, 1925.

1,528,050

UNITED STATES PATENT OFFICE.

FRANK F. FORSHEE, OF FLINT, MICHIGAN, ASSIGNOR TO WESTINGHOUSE ELECTRIC PRODUCTS COMPANY, A CORPORATION OF PENNSYLVANIA.

RESTAURANT WAFFLE IRON.

Application filed August 22, 1922. Serial No. 583,603.

*To all whom it may concern:*

Be it known that I, FRANK F. FORSHEE, a citizen of the United States, and a resident of Flint, in the county of Genesee and State of Michigan, have invented a new and useful Improvement in Restaurant Waffle Irons, of which the following is a specification.

My invention relates to electrically-heated devices and, particularly, to electrically-heated waffle irons.

One object of my invention is to provide an electrically-heated waffle iron for restaurant use that shall embody means for varying the energization of the heating elements in accordance with the position of the two casings of the waffle iron, relatively to each other.

Another object of my invention is to provide a plurality of electrically-heated waffle irons each comprising a pair of superposed casings mounted on a common supporting means and a plurality of manually-operable means for raising the upper casing relatively to the lower casing and for actuating the energy-controlling means.

In the single sheet of drawings.

Figure 1:
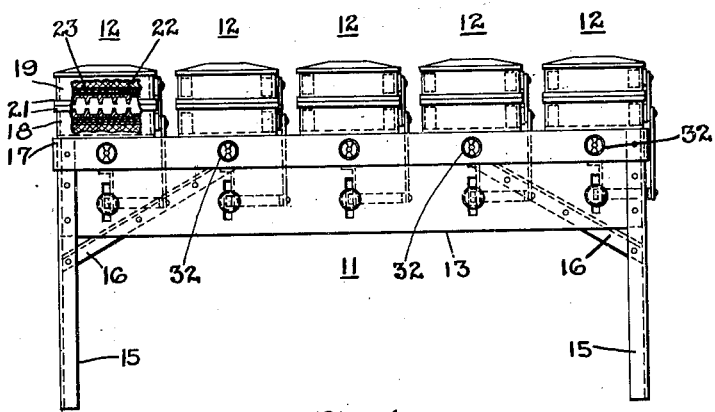
Figure 1 is a view, in front elevation, of a device embodying my invention, portions of one iron being cut away to show the interior construction thereof.

A supporting means 11 for a plurality of electrically heated waffle irons 12 comprises a suitable built-up platform comprising side members 13, and end members 14, which are suitably secured, at their respective ends, to supporting members 15. Brackets 16 may be provided to stiffen the structure. A top plate 17 is provided upon which the respective irons 12 are suitably mounted.

Each of the irons 12 comprises a lower metal casing 18 and an upper metal casing 19. Each of the two superposed casings is provided with a baking surface 21, suitably secured thereagainst to be located in opposed relation to each other. Electric-heating elements 22 are located immediately adjacent the inner faces of the baking surfaces 21, and a quantity 23 of a suitable heat-insulating material is placed between the heating element 22 and the other wall of the casings. The two casings are pivotally connected by a plurality of suitable hinge members 24 located at the back thereof.

Figure 3:
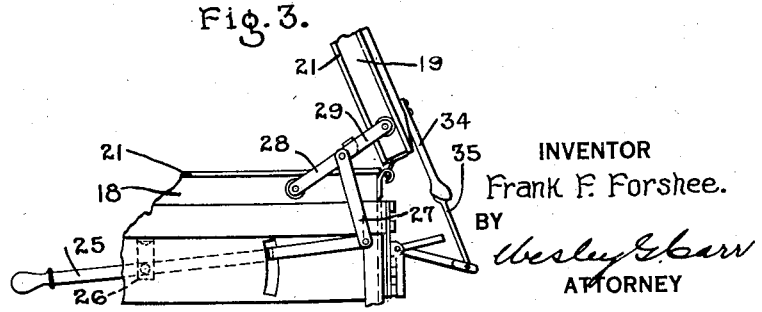
Fig. 3 is a view, in side elevation, with the upper casing raised.

Means for manually raising and lowering the upper casing relatively to the lower casing comprises an elongated offset lever 25 which is pivotally mounted, intermediate its ends, on a suitable support 26 secured to the supporting means 11. The front ends of the levers 25 extend through the front wall 13 in slots provided therefor. The other end of the lever 25 is pivotally connected to one end of an intermediate link member 27, the other end of which is pivotally connected to the lower ends of the two link members 28 and 29, the upper ends of which are pivotally connected respectively to the lower and the upper casing. The lengths of the links 28 and 29 and their pivotal connections to the casings 18 and 19 are such that, when the handle end of the lever 25 is depressed, the upper casing is raised on the hinge members 24 relatively to the lower casing. When the lever 25 is moved to the extent permitted by a device to be hereinafter described in detail, the upper casing occupies substantially the position illustrated in Fig. 3 of the drawing.

An integral stop member 31 is provided adjacent the lower end of the link member 29 at the upper edge thereof, against which the upper edge of the outer end of the link member 28 abuts when the two link members are substantially in alinement relatively to each other, whereby further angular movement of the upper casing relatively to the lower casing is prevented.

Figure 4:
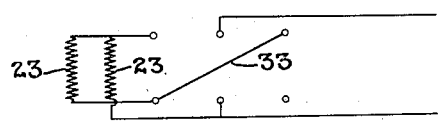
Fig. 4 is a diagrammatic representation of a control system employed with the device embodying my invention.
Figure 2:
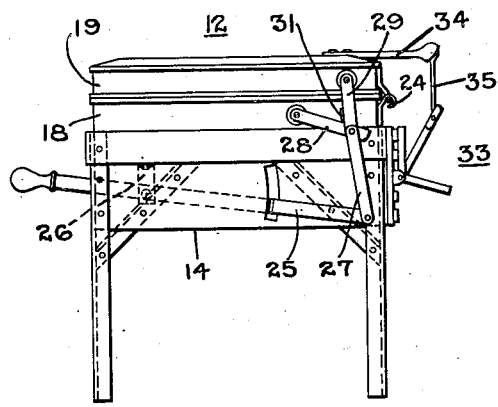
Fig. 2 is a view, in side elevation, of the device embodying my invention.

The heating elements in each of the waffle irons are manually controlled by suitable switches 32, which are electrically connected thereto and are also connected in series-circuit relation to energy-controlling means 33, located at the back of the supporting means 11, the position of which is varied in accordance with the angular position of the upper casing relatively to the lower casing. The energy-controlling means 33 comprises a plural-position double-pole switch, the position of which is varied by a lever 34, one end of which is secured to the upper casing 19. At its other end, the lever 34 comprises a socket which co-operates with the ball end of an intermediate link 35 which is operatively connected to a portion of the switch blade structure of the energy-controlling means 33. Fig. 4 of the drawing illustrates one method of connecting the heating elements in the upper and in the lower casing to permit of connecting them in series-circuit and in parallel-circuit relation. The electrical connections between the heating elements and the energy-controlling means 33 are so arranged that, when the energy-controlling means 33 and the upper casing are in the positions illustrated in Fig. 2 of the drawing, the two heating elements are connected in parallel-circuit relation, whereby a maximum heating effect is obtained. When the upper casing is raised to substantially the position illustrated in Fig. 3 of the drawing, the two heating circuits are connected in series-circuit relation whereby a decreased consumption of electric energy is obtained during the time that the waffle irons are not in actual use. If desired or found necessary, other methods of control of energy may be employed, particularly if it is found that the amount of energy translated into heat when the two heating elements are connected in series-circuit relation is not sufficient to maintain the casings at their proper temperature to be ready for use whenever desired.

Various modifications may be made in my invention without departing from the spirit and scope thereof, and I desire, therefore, to be limited only by the scope of the appended claims.

I claim as my invention:—

1. In a waffle iron, in combination, a plurality of superposed casings, means for moving one of said casings relatively to the other, electric-heating means in each of said casings, and a circuit-controlling means for varying the energization of said heating means in accordance with the position of one of said casings relatively to the other.

2. In a waffle iron, in combination, a plurality of superposed casings, means for varying the angular position of one of said casings relatively to the other, electric-heating means in each of said casings, and a circuit-controlling means for varying the energization of said heating means in accordance with the angular position of one of said casings relatively to the other.

3. In a waffle iron, in combination, a plurality of superposed casings, electric-heating means in each of said casings, manually-operable means for varying the angular position of one of said casings relatively to the other, a plural-position switch for varying the energization of said heating means, and means operatively connected to said switch and to one of said casings for actuating said switch.

4. In a waffle iron, in combination, a plurality of superposed casings, electric-heating elements in each of said casings, manually-operable means for moving said upper casing to its open and to its closed position relatively to the lower casing, a plural-position switch electrically connected to said heating elements and actuated by said upper casing to move said switch to one or the other of its positions to selectively vary the energization of said heating elements.

5. In a waffle iron, in combination, a plurality of superposed casings, electric-heating elements in each of said casings, manually-operable means for moving said upper casing to its open and to its closed position relatively to the lower casing, and a plural-position switch electrically connected to said heating elements and actuated by said upper casing for electrically connecting said heating elements in parallel-circuit relation when the casings are in their closed position and for connecting said heating elements in series-circuit relation when said casings are in their open position relatively to each other.

6. In a waffle iron, in combination, a plurality of superposed casings, hinge members operatively connecting said casings together, a plurality of link members each having one end pivotally connected to one of said casings and having their outer ends pivotally connected together, manually-operable means pivotally connected to the outer link ends for varying the angular position of the upper casing relatively to the lower casing, electric-heating means in each of said casings, and circuit-controlling means actuated by said manually-operable means for varying the energization of said heating means in accordance with the angular position of said upper casing relatively to the lower casing.

7. In a waffle iron, the combination with a plurality of superposed hinged casings, electric heating means in each of said casings, and means for moving the upper of said casings to an open position relatively to the lower casing, of switching means, actuated by said upper casing, for effecting a reduction in the amount of energy translated into heat in both casings when the upper casing is moved to its open position.

8. In a waffle iron, the combination with a plurality of superposed electrically heated casings and hinge members operatively connecting said casings, of a plurality of link members each having one end pivotally connected to one of said casings and having their outer ends pivotally connected together, and a lever member having one end pivotally operatively connected to the outer link ends for varying the angular position of the upper casing relatively to the lower casing.

9. In a cooking apparatus, the combination with two co-operating casings and means for moving the casings relatively to each other, of means for heating the casings, and means for varying the degree of heating in accordance with the relative movement between the casings.

In testimony whereof, I have hereunto subscribed my name this fourth day of August, 1922.

FRANK F. FORSHEE.